United States Patent [19]

Daniels, Jr.

[11] 4,434,872

[45] Mar. 6, 1984

[54] VEHICLE LIFT

[76] Inventor: Llewellyn R. Daniels, Jr., 437 W. 5th Ave., Apache Junction, Ariz. 85220

[21] Appl. No.: 356,179

[22] Filed: Mar. 8, 1982

[51] Int. Cl.[3] .............................................. B60S 13/00

[52] U.S. Cl. .................................... 187/8.74; 254/2 R

[58] Field of Search ..................... 187/8.41, 8.74, 8.75, 187/8.43, 8.45, 1 R, 8.54, 8.62; 182/141, 149, 63; 108/53.5, 91, 111; 254/2 R, 2 B, 2 C, 45, 93 L, 93 R; 248/346

[56] References Cited

U.S. PATENT DOCUMENTS 2,828,933 4/1958 DePew et al. ..................... 108/53.5
3,250,346 5/1966 Swick, Jr. .......................... 187/8.54
3,590,958 7/1971 Elswick ............................. 187/8.74

*Primary Examiner*—Joseph J. Rolla

*Assistant Examiner*—Kenneth Noland

*Attorney, Agent, or Firm*—Harry M. Weiss; Charles Paul Padgett, Jr.

[57] ABSTRACT

An improvement to a conventional hydraulic automobile lift, particularly adapted to lifting an automobile having a suspended, "dead" rear axle. The conventional lift included saddles for cradling the wheels, forks connected to a hydraulic ram for lifting the vehicle axle, and a shifting mechanism for engaging the wheel saddles with the axle forks. The improvement incorporates the step of extending the shifting mechanism-actuated lifting interface between the axle-fork assembly and the wheel-saddle assembly, so that damage to the vehicle undercarriage from the axle forks is avoided when using the wheel-lift mode upon a vehicle having limited clearance around a "dead" type rear axle.

18 Claims, 10 Drawing Figures

FIG. 1
(PRIOR ART)
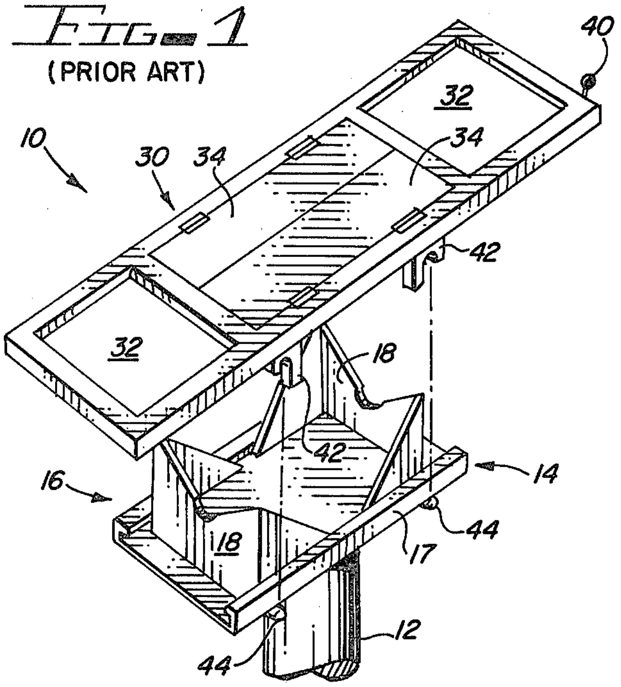
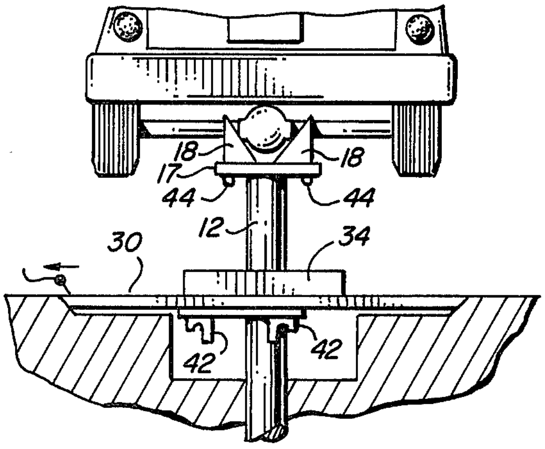
FIG. 5
(PRIOR ART)
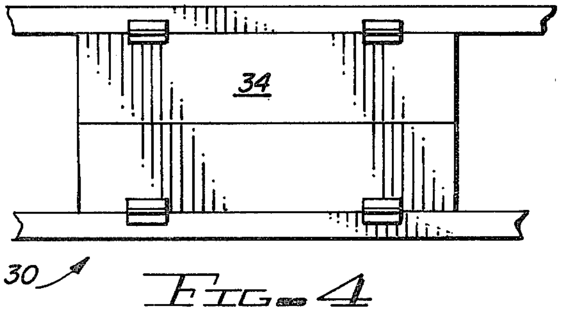
FIG. 4
(PRIOR ART)
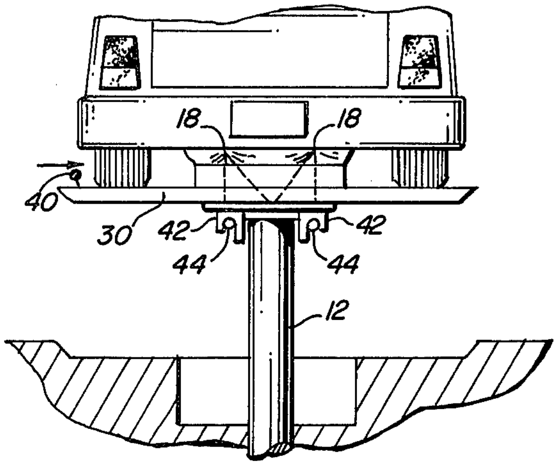
FIG. 6
(PRIOR ART)
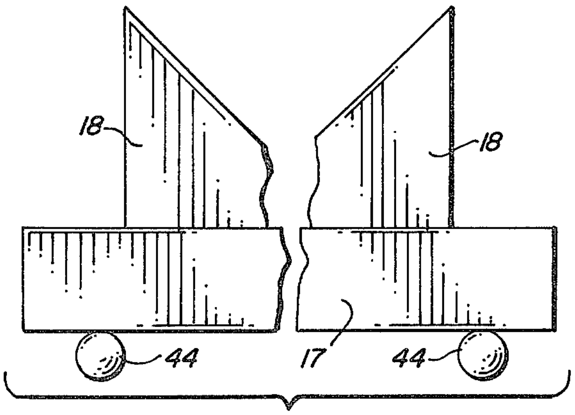
FIG. 2
(PRIOR ART)

VEHICLE LIFT

BACKGROUND OF THE INVENTION

1. Field of the Invention

This invention relates to lifting devices, and, more particularly, to a hydraulic vehicle lift which is capable of lifting an end of a contemporary automobile either by an adjacent pair of wheels, or by a "dead" type axle supporting the wheels, without damaging the autmobile with the upright axle-forks of the lift when the vehicle is lifted by the wheels.

2. Description of the Prior Art

In the past, hydraulic vehicle lifts were developed to permit a person to conveniently work beneath a vehicle. A conventional hydraulic lift included a operating head, mounted atop an extensible hydraulic ram. Two operating-head-supporting rams were often used to lift the respective ends of the vehicle.

To serve in the common situation of on-going use of the lift to consistently service a particular type of vehicle, lifts with fixed-position lifting surfaces were commonly employed. To allow service access to the vehicle, with the wheels, connected axle assembly and supporting springs either loaded or unloaded, a dual-mode operating head for a hydraulic lift was developed. The dual-mode head presented alternate sets of fixed-lifting surfaces. The dual-mode head included a ram-mounted set of forks for meeting and lifting the axle of the vehicle, and also included a set of wheel saddles for alternately lifting the vehicle by the wheels. A shifting mechanism allowed a set of yokes, or sockets, to be shifted to either of two positions. In the first position, the yokes could be engaged for lifting the vehicle with the wheel saddles. In the second position, the yokes would be bypassed and the axle forks could pass through the plane of the wheel saddles and thus lift the vehicle by the axle.

Recently, popular, mass-produced automobiles have utilized a "dead" type rear axle. Being physically smaller than the tranditional "live" type driving rear axle, a smaller space was required to mount the axle beneath the vehicle, and a more efficient utilization of interior space was allowed. However, a problem arose, because the dual-mode hydraulic vehicle lifts of the past were built to operate in the larger axle openings which had been previously commonly used. When used to lift a "dead" type axle vehicle, the protrusion of the axle forks beyond the upper surface of the wheel saddle, combined with the preexisting compression of the suspension springs, caused contact of the axle forks against the lower surface of the vehicle chassis.

The resulting damage was an expensive problem. A need continued to exist for a fork-equipped, dual-mode, operating head for a hydraulic vehicle lift, which operating head would permit the vehicle to be lifted by the wheels without causing fork-damage to the lower surfaces of the vehicle.

BRIEF DESCRIPTION OF THE DRAWING

FIG. 1 is a perspective view of a vehicle lift of the prior art.

FIG. 2 is a frontal elevational view of the fork assembly of the lift of FIG. 1.

FIG. 4 is a partial plan view of the doors of the saddle assembly of the lift of FIG. 1.

FIG. 5 is a partially sectioned view of the lift of FIG. 1 in use in the axle-lift mode of operation.

FIG. 6 shows a problem associated with the use of the lift of FIG. 1.

SUMMARY OF THE INVENTION

Figure 3:
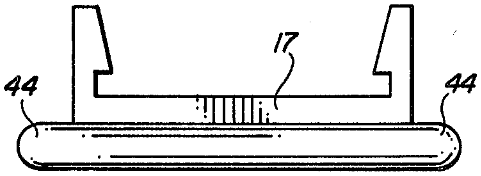
FIG. 3 (PRIOR ART)
FIG. 3 is a partial end view of the channel body of the fork assembly of FIG. 1.

It is an object of this invention to eliminate the damage which occurs to the underside of a vehicle when the forks of a convertible-type vehicle lift project too far beyond the wheel-contact surface of the lift when the vehicle is being lifted by the wheels.

DESCRIPTION OF THE PREFERRED EMBODIMENT

In a method for lifting a vehicle with a vehicle lift having: a ram; axle forks coupled to said ram; wheel saddles; a yoke mechanism to selectively permit the ram to lift both the axle forks and the wheel saddles; wherein the lifting point of said yoke mechanism occurs at a point in the stroke of said ram subsequent to the contact of said forks against the underside of said vehicle, an improvement is disclosed, comprising the step of raising said lifting point with respect to the lowered position of said wheel saddles so that said forks avoid said underside.

The foregoing and other objects, features and advantages will be apparent from the following, more particular, description of the preferred embodiment of the invention, as illustrated in the accompanying drawings.

THE SPECIFICATION

In FIG. 1, reference number 10 generally shows a convertible-type hydraulic vehicle lift, as was known in the prior art. The lift 10 was driven by a ram 12. The ram 12 operated as a piston, in response to hydraulic fluid delivered by a conventional pump-and-valve system. A lift head, as shown generally by reference number 14, provided alternate lifting devices, respectively adapted to engage different portions of the underside of the vehicle. The lift 10 utilized a fork assembly, as shown generally by reference number 16. The fork assembly 16 included a channel body 17, which supported forks 18. The forks 18 were arranged to engage a live, beam-type driving axle of a vehicle. The channel 17 of the fork assembly 16 was directly mounted atop the ram 12.

A wheel saddle assembly 30 utilized spaced saddles 32, which, in combination, cradled an adjoining parallel pair of the wheels of the vehicle. Doors 34 formed a part of the wheel saddle assembly 30. A movable control lever 40 could be placed in an axle-lift-mode position, thereby allowing the forks 18 to travel freely upward through the doors 34. In the alternative, the control lever 40 could be placed in a wheel-lift-mode position, thereby cuasing the fork assembly 16 to lift both the saddle assembly 30, and the vehicle.

Yokes 42, connected to and controlled by the lever 40, rode in sliding contact upon the lower face of the saddle assembly 30. When the control lever 40 was moved to the wheel-lift-mode position, the yokes 42 were laterally shifted into alignment above yoke pins 44. When the control lever 40 was moved to the axle-lift-mode position, the yokes 42 were shifted out of alignment with respect to the yoke pins 44. The yoke pins 44 were rigidly connected to the channel body 17.

FIG. 2 shows a partial frontal elevational view of the fork assembly 16. The forks 18 extend upward from the channel body 17. The yoke pins 44 are connected, in a parallel-spaced relationship, below the channel body 17.

FIG. 3 is a partial end-elevational view of the fork assembly 16, showing how the yoke pins 44 extend beyond the width of the channel body 17. For clarity, the fork 18 are not shown in FIG. 3.

FIG. 4 is a partial plan view of the saddle assembly 30, showing a central portion thereof. The yoke pins 44 pass freely through the door when the lift 10 is used in the axle-lift mode.

FIG. 5 shows the lift 10 in use, in the axle-lift mode.

FIG. 6 illustrates a part of the problem which existed with the lift 10 of the prior art. The yokes 42 are shown shifted into the wheel-lift mode of operation. The problem arose when a late-model vehicle, having a "dead" type axle mounted in a reduced-size axle opening, (front wheel drive), was lifted with the lift 10. Even in the wheel-lift mode as illustrated, with the yokes 42 and the yoke pins 44 aligned, the forks 18 passed upward through the doors 34 when the ram 12 was operated. As the forks 18 passed through the doors 34, the forks actually ran into the underside of the vehicle before the yoke pins 44 made lifting contact with the yokes 42. The resulting damage was a problem, aggravated when the vehicle was a new car.

Similar damage resulted when the lift 10 was used to lift a similar, late-model vehicle in the axle-lift mode.

Figure 7:
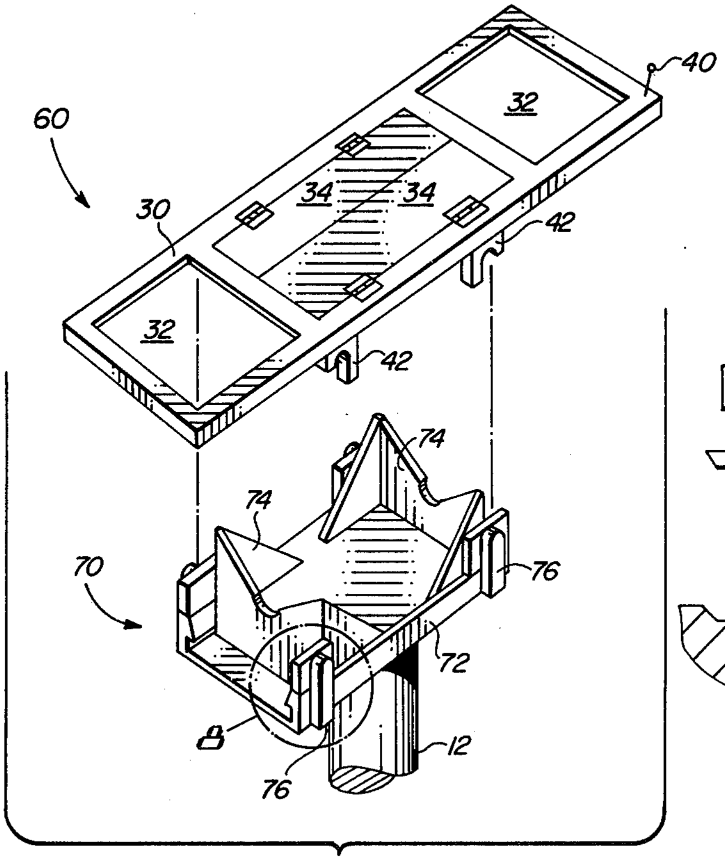
FIG. 7 is a perspective view of an improved vehicle lift.

FIG. 7 is a perspective illustration of an improved vehicle lift, as shown generally by reference number 60. Parts common to both the conventional lift 10 and the improved lift 60 are shown by common reference numbers. The ram, and the saddle assembly 30, are identical in both devices 10, 60. The improved lift 60, however, employs a modified fork assembly, as shown generally by reference number 70, to avoid the problem illustrated in FIG. 6. A channel body 72 is mounted atop the ram 12. Forks 74, extend upward from the channel body 72. Reinforced yoke tangs 76 adjoin the forks 74, and also extend upwardly from the channel body 72. As with the yoke pins 44, the yoke tangs 76 can pass through the door opening in the saddle assembly 30.

Figure 9:
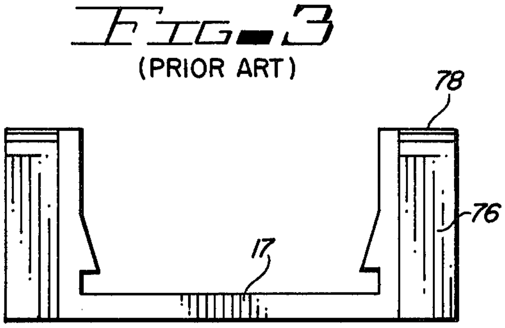
FIG. 9 is a partial end view of the fork assembly of the lift of FIG. 7.
Figure 8:
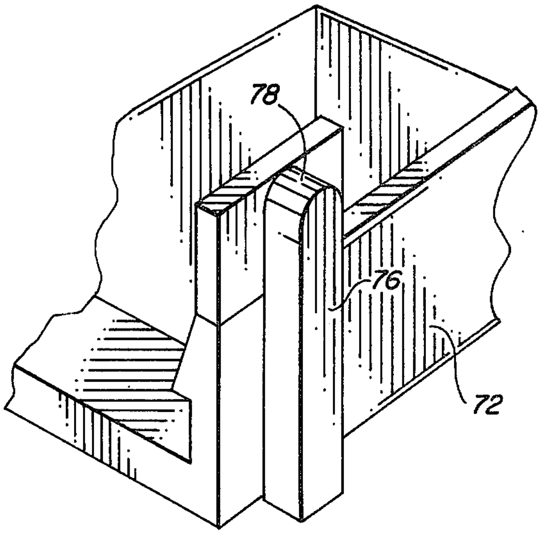
FIG. 8 is an enlarged perspective view of the improved yoke tang of the lift of FIG. 7.

FIG. 8 is an enlarged perspective view of the yoke tangs 76, referenced from numeral 8 of FIG. 7. The yoke tangs 76 have a yoke tang contact surface 78, which at rest sits at a higher elevation with respect to the lifting saddles 32, than does the uppermost surface of the yoke pins 44 of the lift 10 of the prior art. Each of the yoke tang contact surfaces 78 is positioned to meet one of the yokes 42. The disparity in elevations is clearly seen by contrasting FIG. 9, an elevational end view of the channel 72 of the fork assembly 70, with the pins 44 illustrated in FIG. 3, showing the fork assembly 16 of the prior art.

Figure 10:
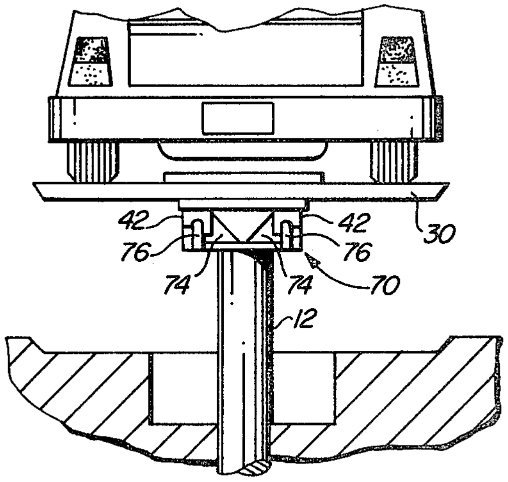
FIG. 10 is an elevational view of lift of FIG. 7 in use in the wheel-lift-mode of operation without damaging the lifted vehicles.

FIG. 10 is a partially sectioned elevational view, showing the improved lift 60 in use. It can be seen that the modified fork assembly 70 causes the saddle assembly 30 to be lifted at an earlier point in the stroke of the ram 12, and thereby avoids the impact-problem associated with the lift 10 of the prior art.

While the invention has been particularly shown and described with reference to preferred embodiments thereof, it will be understood by those skilled in the art that the foregoing and other changes in form and details may be made therein without departing from the spirit and scope of the invention which is limited only by the appended claims.

I claim:

1. In an apparatus for hydraulically lifting a motor vehicle having:

- a hydraulically operated, generally vertical ram;
- axle fork means operatively coupled to said ram proximate the top distal end portion thereof;
- a pair of spaced apart wheel saddle means for operatively engaging two parallel opposing tires of a motor vehicle at a time;
- a yoke mechanism operatively secured to the lower surface of said wheel saddle means for lifting same to selectively permit the hydraulically operated ram to lift both the axle fork means and the wheel saddle means; and
- the improvement comprising: yoke tang means for raising the lifting point in the vertically upward stroke of said hydraulically operated ram so that operative lifting engagement with the yoke mechanism of said wheel saddle means occurs earlier in said vertically upward stroke so that said axle fork means avoids the underside of said vehicle and the damage resulting therefrom.

2. The improved vehicle lifting apparatus of claim 1 wherein said axle fork means includes a channel body and said yoke tang means includes a generally rectangular elongated bar operably disposed against the surface of the longitudinal sides of said channel body substantially adjacent the corner portions thereof, said bar being disposed with its longitudinal axis substantially vertical and parallel with the longitudinal axis of the ram and including a rounded yoke-engaging portion proximate the top distal end portion thereof.

3. The improved vehicle lift apparatus of claim 2 wherein said channel body further includes a pair of longitudinal sides and a backup plate extension coplanar with said sides and fixedly secured thereto at least proximate the corner portions thereof for providing an extended surface to which said elongated bar may be operably secured.

4. The improved vehicle lifting apparatus of claim 3 wherein the height of the longitudinal sides of said channel is approximately equal to the height of said backup plate extension and the combined height of said channel sides and backup plate extension operatively secured thereto is approximately equal to the length of said elongated bar secured thereto.

5. The improved vehicle lifting apparatus of claim 4 wherein said body channel, said backup extension and said elongated bar are adapted to pass through said doors when said vehicle lift is in an axle-lifting mode of operation.

6. In a dual-mode hydraulic vehicle lift having a hydraulically-operated, substantially vertically disposed, piston-like ram means, a lift head assembly operatively disposed on the top distal end portion of said ram means, said lift head assembly including a channel body means for supporting a fork means for engaging a beam-like driving axle of a vehicle, a wheel saddle means including spaced wheel-engaging saddles for operatively cradeling a pair of parallel wheels of a motor vehicle being lifted upwardly opening door means operably disposed between said spaced saddles, control means having an axle lift position for enabling said fork means to travel upwardly through said door means and engage spaced apart points on the vehicle axle for lifting same and a wheel lift mode of operation for enabling the channel body means to lift both the wheel saddle means and the vehicle, said wheel saddle means including four downwardly disposed yoke means operatively coupled to and controlled by said control means, each of said yoke means in sliding contact with the bottom portion of said wheel saddle means being operably disposed in a parallel relationship with the sides of the channel body means and including a substantially downwardly disposed slot means for operatively receiving a yoke-engaging member therein for raising said wheel saddle means and said vehicle, the improvement comprising:

- an extension plate rigidly secured in a substantially vertical position coplanar with the longitudinal sides of said channel body means and proximate each of the four corners of said channel body means for vertically extending the longitudinal sides thereof; and
- an elongated yoke-engaging member having a yoke-engaging end portion at the vertically upper end portion thereof rigidly secured to the longitudinal sides of said channel body portion and said extension plate means proximate the four corners thereof with its longitudinal axis substantially vertical and parallel to the longitudinal axis of said ram means, the yoke engaging means at the upper distal ends of each of said elongated yoke-engaging members for operatively engaging said slots in said yoke means "n" inches sooner where $4 \leqq n \leqq 10$ inches for preventing said fork means from passing through said upwardly opening door means and damaging the underside of vehicles having front wheel drives and the like when said dual mode vehicle lift is in the wheel lift mode of operation.

7. The improved vehicle lift of claim 6 wherein the height of the longitudinal sides of said channel body means is approximately equal to the height of said extension plate.

8. The improved vehicle lift of claim 7 wherein the height of the longitudinal channel body sides plus the height of the extension plates is approximately equal to the length of the vertical aligned yoke-engaging member.

9. The improved vehicle lift of claim 6 wherein the height of the extension plate is approximately equal to the height of the longitudinal channel sides and the width of the extension plate is less then the height of the yoke-engaging member and the thickness of the yoke-engaging member is less then half the width of the extension plate.

10. The improved vehicle lift of claim 6 wherein the thickness of the yoke-engaging member is given by "x", where the width of the extension plate is approximately "2x" and the length of the yoke-engaging member is less then "4x".

11. An improved channel body-fork assembly for a dual-mode hydraulic vehicle lift including a wheel saddle assembly having yoke means thereon for preventing damage to front wheel drive vehicles and vehicles having relatively smaller rear axles and the like, comprising:

- a back-up metal extension plate operatively secured to the top longitudinal edge of said channel body substantially adjacent to each of the four corners thereof and said extension plate being operably disposed vertically upward to be coplanar with the plane of the longitudinal sides of said channel body; and
- a generally rectangular elongated yoke-engaging member operatively secured to the outer surface of said longitudinal channel body sides and said extension plates proximate the four corners of said channel body, said yoke-engaging member including a generally rounded upwardly disposed end portion for operatively engaging the yokes of said wheel saddle assembly for lifting said wheel saddle assembly and said vehicle simultaneously without said fork assembly damaging the vehicle.

12. The improved channel body fork assembly of claim 11 wherein said backup metal extension plate is welded to the top vertical longitudinal sides of said channel body and said elongated yoke-engaging member has its back portion welded against both the longitudinal sides of said channel body and the extension plates on the outer surface thereof.

13. The improved channel body fork assembly of claim 11 wherein the height of each of the longitudinal sides of the channel body is approximately equal to the height of the extension plate.

14. The improved channel body fork assembly of claim 13 wherein the height of the longitudinal sides of the channel body together with the height of the extension plate is approximately equal to the elongated vertical length of the yoke engaging member.

15. In a dual-mode hydraulic vehicle lift having a ram, a lift head on the top of the ram, the lift head including a fork assembly and a channel body supporting the fork assembly, a wheel saddle platform including spaced apart saddles for operatively holding an adjoining pair of wheels of the vehicle being lifted and door means between the space saddles opening upwardly to admit the fork assembly therethrough in the axle pickup mode of operation, yokes including downwardly facing slots mounted on the sides of the wheel saddle plateform for lifting the wheel saddle platform, the vehicle, and the fork assembly during the wheel lift mode of operation, a method of protecting the undercarriage of the vehicle from damage resulting from contact with the fork assembly comprising the steps of:

- driving a motor vehicle onto the wheel saddle assembly;
- positioning the adjacent pairs of parallel wheels for operably holding same within the saddle portion at opposite ends of the wheel saddle platform;
- raising the hydraulically operated ram carrying the channel body and fork assembly;
- rigidly securing yoke-engaging members on the sides of said channel body;
- continuing to raise said ram until the yoke-engaging members enter the slots of the wheel saddle platform yokes for lifting same a distance "x" sooner than possible without said yoke-engaging members;
- preventing said fork assembly from entering through said upwardly opening doors and damaging the undercarriage of said motor vehicle; and
- lifting the wheel saddle platform and motor vehicle with said hydraulic ram to a desired work position while preventing the fork assembly from penetrating through the upwardly opening doors.

16. The improved method of claim 15 wherein said step of preventing includes providing an elongated yoke tang whose length is a distance "l"; and engaging the slots of the distending yokes of the wheel saddle platform a distance "l" sooner in the position of rise of the hydraulic ram.

17. The improved method of claim 15 wherein said step of preventing further includes:

extending the height of the side of said channel body; and fixedly securing the elongated yoke tang proximate said channel body side and extension thereof operably disposed substantially vertically with its yoke-engaging end extending vertically upward for entering the slots of said wheel saddle platform yokes.

18. The improved method of claim 17 wherein said step of engaging the yokes of the wheel saddle platform with the yoke engaging end portion of the yoke tang for lifting the wheel saddle platform includes said yoke engaging portion entering the slots in said yoke of said wheel saddle platform sufficiently early in the rise of the ram to prevent damage to the motor vehicle while lifting same with the wheels disposed in opposite end portions of the wheel saddle platform.

* * * * *